(12) United States Patent
Sharma et al.

(10) Patent No.: US 12,510,960 B2
(45) Date of Patent: Dec. 30, 2025

(54) FRAME TRACKING SYSTEM FOR A HEAD-MOUNTED DEVICE

(71) Applicant: Meta Platforms Technologies, LLC, Menlo Park, CA (US)

(72) Inventors: Robin Sharma, Woodinville, WA (US); Karol Constantine Hatzilias, Sammamish, WA (US); Ruobing Qian, Kenmore, WA (US); Mohamed Tarek Ahmed El-Haddad, Redmond, WA (US); Francesco Larocca, Kirkland, WA (US); Edbert Jarvis Sie, Union City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/379,482

(22) Filed: Oct. 12, 2023

(65) Prior Publication Data

US 2024/0184357 A1    Jun. 6, 2024

Related U.S. Application Data

(60) Provisional application No. 63/429,341, filed on Dec. 1, 2022.

(51) Int. Cl.
*G06F 3/01* (2006.01)
*G06F 3/03* (2006.01)
(Continued)

(52) U.S. Cl.
CPC .............. *G06F 3/013* (2013.01); *G06F 3/012* (2013.01); *G06F 3/0317* (2013.01);
(Continued)

(58) Field of Classification Search
CPC ........ G06F 3/013; G06F 3/012; G06F 3/0317; G06F 3/0346; G06F 1/1637; G06T 7/70;
(Continued)

(56) References Cited

U.S. PATENT DOCUMENTS

2012/0007800 A1* 1/2012 Jaroslaw .............. H04N 13/332
                                                              345/156
2017/0153672 A1* 6/2017 Shin ................ H04M 1/724097
(Continued)

FOREIGN PATENT DOCUMENTS

CN           1724969 A  *  1/2006  ......... G01D 5/34715

OTHER PUBLICATIONS

Avago Technologies., "Optical Mouse Sensors," [Retrieved on Oct. 13, 2023], 1 page.

*Primary Examiner* — Matthew A Eason
*Assistant Examiner* — Scott D Au
(74) *Attorney, Agent, or Firm* — Freestone Intellectual Property Law PLLC; Aaron J. Visbeek

(57) ABSTRACT

An apparatus, system, and method for an eye tracking system for a head-mounted device include a light source, an image sensor, and a frame tracking system. The light source and image sensor may be configured to determine absolute and relative eye orientations. The frame tracking system may be configured to determine the displacement of a head-mounted device frame relative to the face of the user. The frame tracking system may provide displacement data for the displacement of the head-mounted device frame to the eye tracking system to enable the eye tracking system to compensate for frame slippage, frame jostling, or other frame displacement (relative to the face of the user). The frame tracking system may include one or more position sensors disposed on the head-mounted device frame and
(Continued)

logic configured to determine displacement data using information from the one or more position sensors.

20 Claims, 7 Drawing Sheets

(51) Int. Cl.
*G06F 3/0346* (2013.01)
*G06T 7/70* (2017.01)
*G06V 40/16* (2022.01)

(52) U.S. Cl.
CPC .............. *G06F 3/0346* (2013.01); *G06T 7/70* (2017.01); *G06V 40/176* (2022.01); *G06T 2207/30201* (2013.01)

(58) Field of Classification Search
CPC . G06T 2207/10016; G06T 2207/30201; G06T 2207/30196; G06V 40/176
See application file for complete search history.

(56) References Cited

U.S. PATENT DOCUMENTS

| | | | | |
|---|---|---|---|---|
| 2018/0158246 | A1* | 6/2018 | Grau | G06T 3/18 |
| 2018/0364048 | A1* | 12/2018 | Cook | G06F 3/0346 |
| 2020/0372702 | A1* | 11/2020 | Yan | G06F 3/017 |
| 2021/0093192 | A1* | 4/2021 | Gründig | A61B 3/102 |
| 2024/0053822 | A1* | 2/2024 | Takada | G02B 27/0172 |

\* cited by examiner

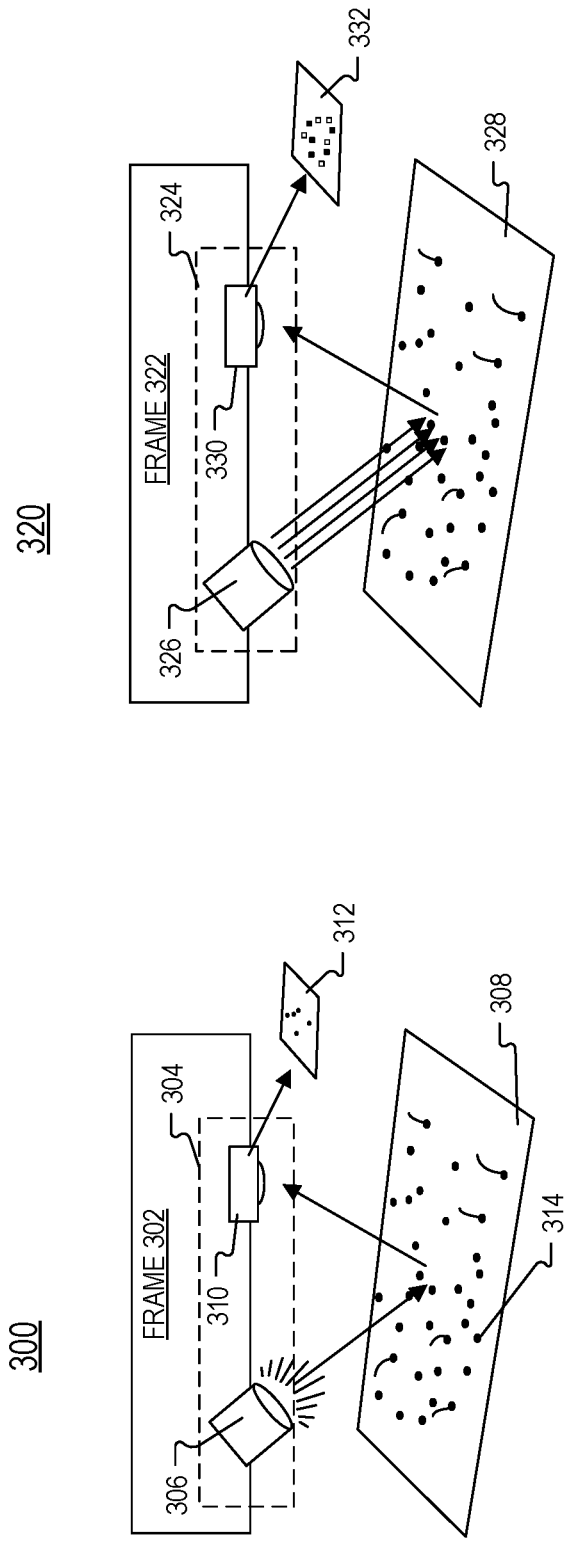

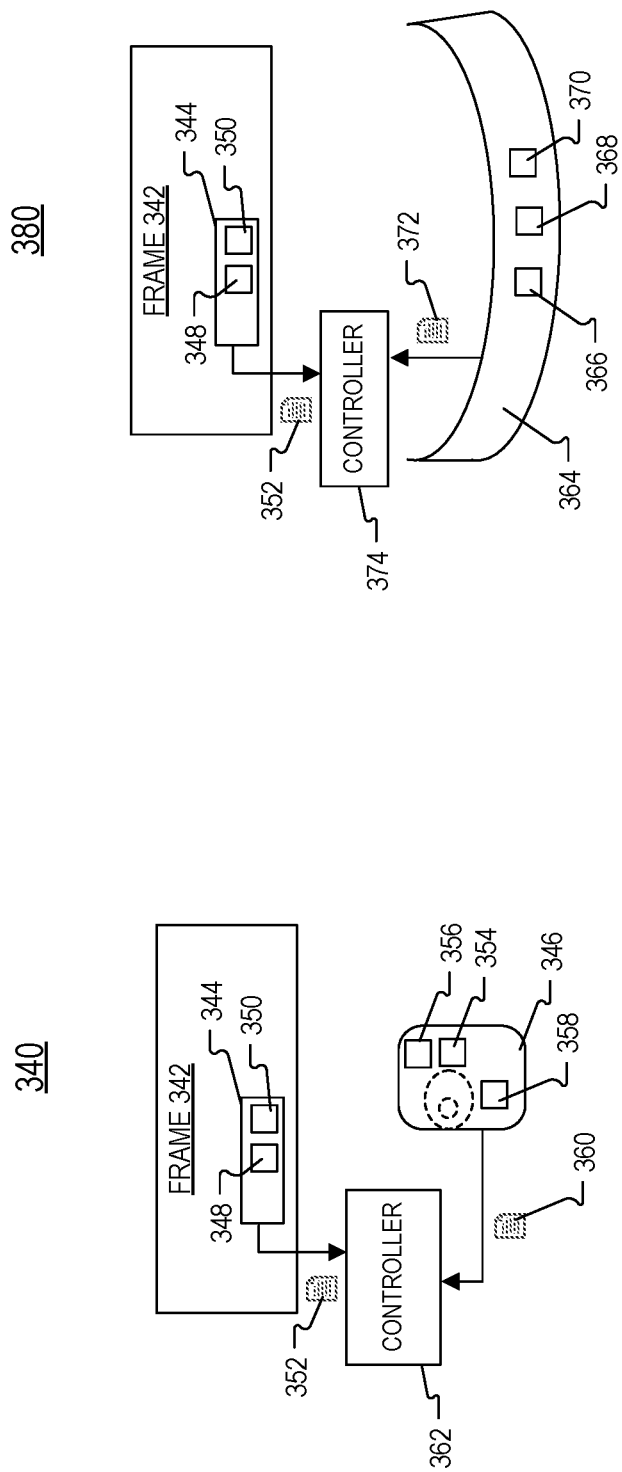

FRAME TRACKING SYSTEM FOR A HEAD-MOUNTED DEVICE

CROSS-REFERENCE TO RELATED APPLICATIONS

This application claims priority to U.S. provisional Application No. 63/429,341 filed Dec. 1, 2022, which is hereby incorporated by reference.

TECHNICAL FIELD

This disclosure relates generally to head-mounted devices, and in particular to eye tracking systems in head-mounted devices.

BACKGROUND INFORMATION

Eye tracking technology enables head-mounted devices to interact with users based on the users' eye movement or eye orientation. The accuracy of eye tracking systems can be limited by noise introduced into the eye tracking system.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 3A, 3B, 3C, and 3D illustrate example diagrams of sensor configurations that may be used to determine head-mounted device frame displacement, in accordance with aspects of the disclosure.

DETAILED DESCRIPTION

Figure 1A:
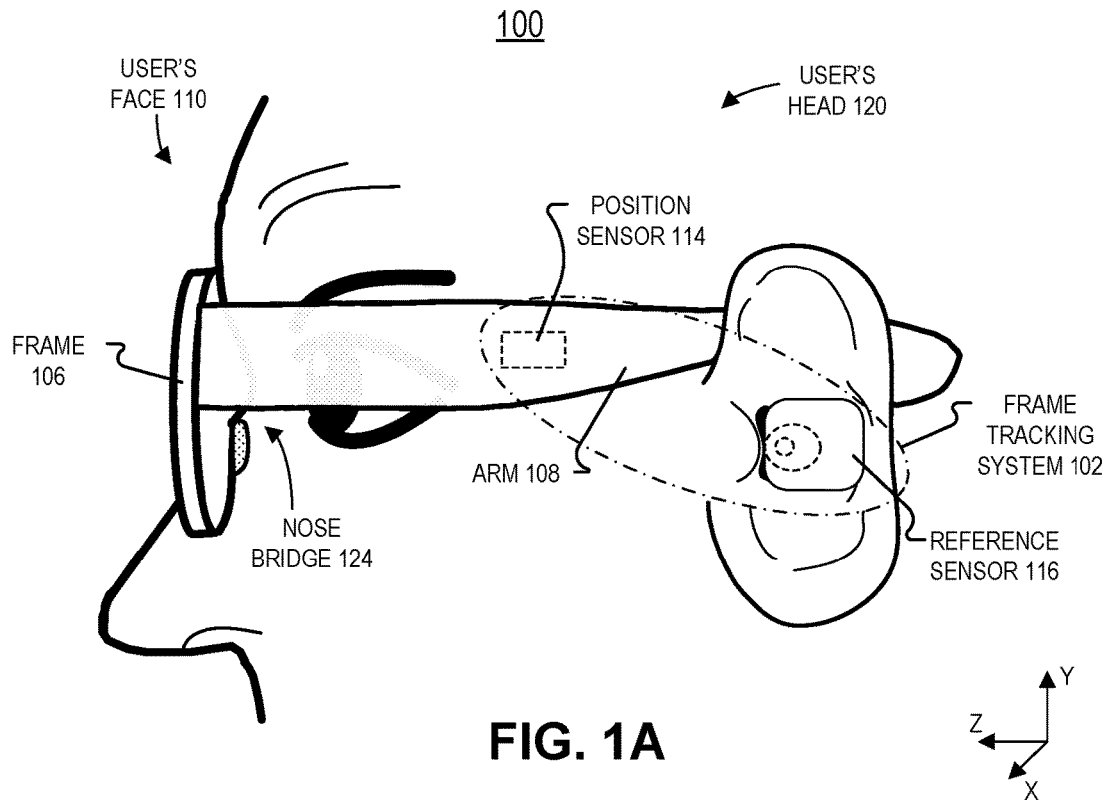
FIGS. 1A, 1B, and 1C illustrate example diagrams of a head-mounted device configured to use frame tracking to improve eye tracking accuracy, in accordance with aspects of the disclosure.

Embodiments of a frame tracking system for a head-mounted device are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

As used herein a frame refers to a head-worn device that carries at least one lens assembly. A frame could refer to devices having spectacle form factor, devices that are helmet based, devices having a virtual reality (VR) form-factor, or devices having an augmented reality (AR) form factor, for example.

Eye-tracking in AR/VR devices can be performed using camera-based technologies, which is known as video oculography. Eye tracking operations may include capturing an image of the eye (e.g., for every frame), identifying relevant regions of interest in the images, and estimating the size and location of the pupil center and cornea center. Estimating the size and location of the pupil center and cornea center may include calibration operations that determine the curvature of the cornea. Eye tracking operations may use the size and location of the pupil center and cornea to determine a gaze vector or a gaze of the user's eye, which may be referred to as the absolute gaze.

Some approaches to eye tracking have drawbacks. Some of the drawbacks may include: 1) high power consumption and latency related to capturing/recording every image frame for processing; 2) a lot of computations are consumed for every frame that drive up power consumption; 3) temporal sampling rate can be limited by the frame rate limitations of the camera; and 4) relative changes in eye-position from a starting point are challenging to estimate if the entire pipeline of eye tracking operations are executed.

Even with advances in eye tracking systems, frame slippage, frame movement, or other frame displacement may impact the accuracy of the eye tracking system. Embodiments of a frame tracking system are disclosed herein that may be used to determine head-mounted device frame displacement and to provide the displacement data to the eye tracking system, which may disambiguate eye movement from frame movement.

The frame tracking system may include one or more position sensors and processing logic, in accordance with aspects of the disclosure. The one or more position sensors may be coupled to various locations on a head-mounted device frame (e.g., near a user's temple) and configured to detect displacement of the head-mounted device frame relative to the head of a user. The one or more position sensors may include a low-power and high-speed sensor for tracking the movement of the frame with respect to the head. The one or more positions sensors may include relative position sensors, absolute position sensors, references sensors, proximity sensors, inertial measurement units (IMUs), laser speckle interferometry with optic flow, and/or optic flow without laser, according to various implementations. The processing logic may be coupled to the one or more position sensors to receive displacement data, and the processing logic may be configured to determine a quantity of displacement of the head-mounted device frame relative to the head of the user. Various aspects of embodiments of the frame tracking system and eye tracking system are further detailed below.

The apparatus, system, and method for frame tracking that are described in this disclosure may enable improvements in eye tracking technologies, for example, to support operations of a head-mounted device. These and other embodiments are described in more detail in connection with FIGS. 1A-5.

Figure 1B:
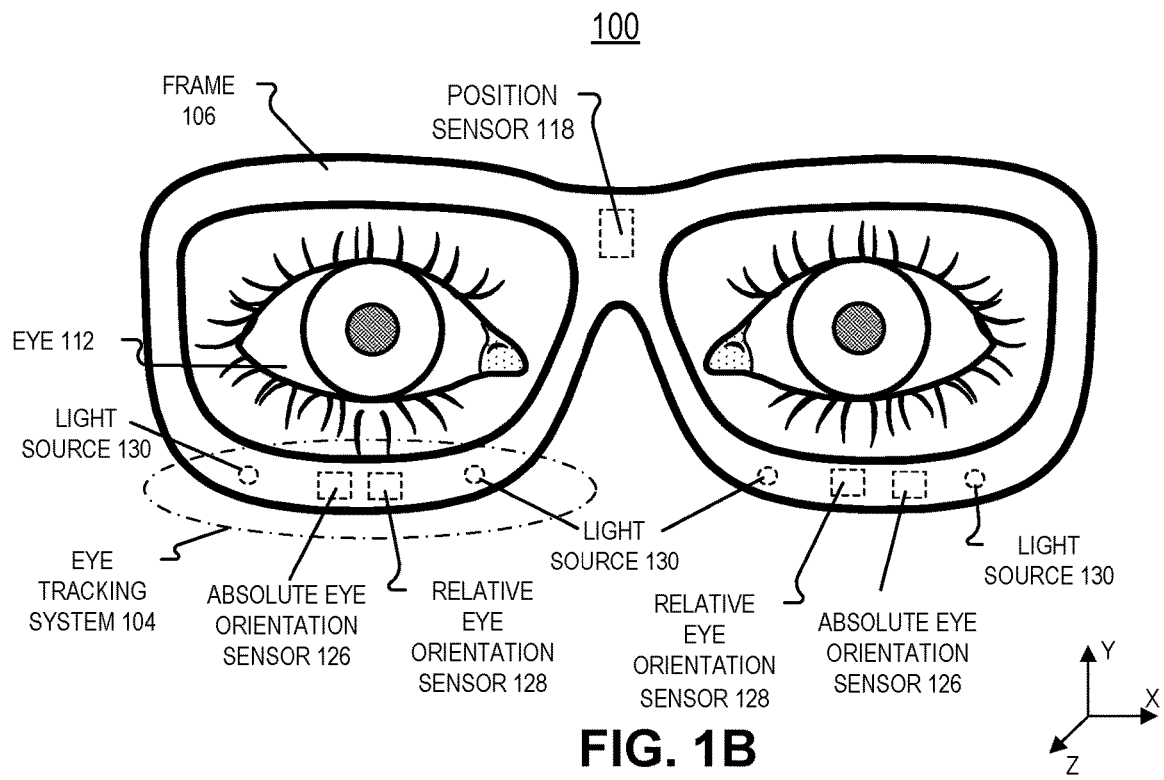
Figure 1C:
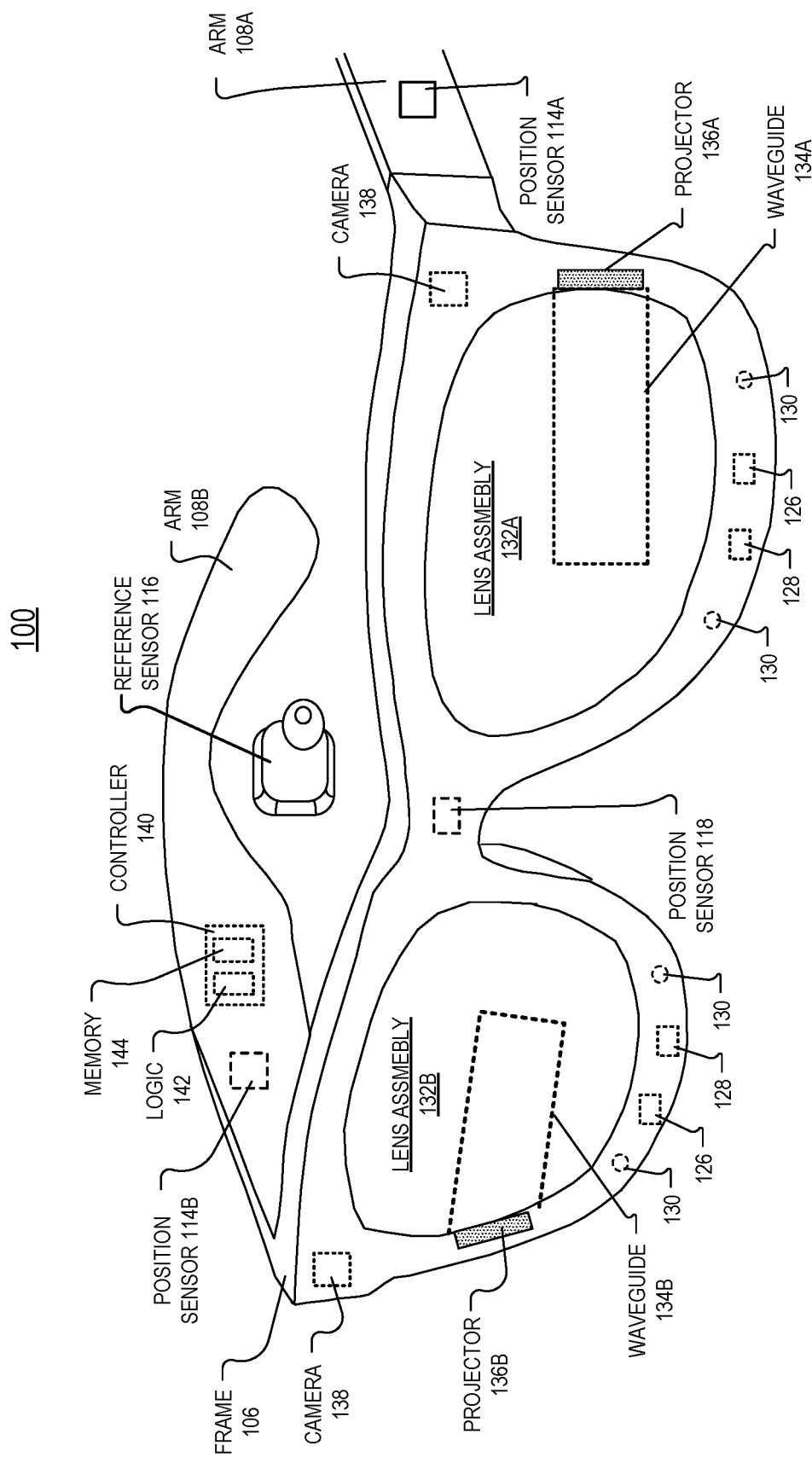

FIGS. 1A, 1B, and 1C illustrate an example of a head mounted device 100 that is configured to use frame tracking to improve eye tracking accuracy, in accordance with aspects of the disclosure. Head-mounted device 100 includes a frame tracking system 102 and an eye tracking system 104 that are coupled to a frame 106 (inclusive of an arm 108), according to an embodiment. By using frame tracking system 102 to determine the displacement of frame 106 relative to a user's face 110, eye tracking system 104 can identify and compensate for noise in eye tracking system 104, according to an embodiment. Because eye tracking system 104 may be configured to use changes in eye orientation to perform eye tracking, displacement of frame 106 relative to user's face 110 may be inadvertently interpreted as a change in orientation of an eye 112, even if eye 112 happened to be fixed. By ignoring or compensating for displacement of frame 106 relative to user's face 110, eye tracking system 104 may improve the accuracy of eye tracking, according to an embodiment. A head-mounted device, such as head-mounted device 100, is one type of smart device. In some contexts, head-mounted device 100 is also a head-mounted display (HMD) that is configured to provide artificial reality. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Frame tracking system 102 includes a position sensor 114, a reference sensor 116, and a position sensor 118, for determining a position or displacement of frame 106, according to an embodiment. Position sensor 114 may be configured to determine a quantity of displacement experienced by arm 108 along the y-axis or z-axis, and the displacement of arm 108 may correspond with a displacement of frame 106, according to an embodiment. Position sensor 114 may use a light source and an image sensor to determine position or displacement along at least two axes. Position sensor 114 may include a gyroscope and/or an accelerometer to determine an absolute displacement of arm 108 or head-mounted device 100. Reference sensor 116 may include a gyroscope and/or an accelerometer to determine an absolute displacement of a user's head 120. A difference between the displacement measured by position sensor 114 and reference sensor 116 may be indicative of displacement of frame 106 relative to user's face 110, according to an embodiment. If the displacement measured by position sensor 114 and reference sensor 116 are similar, the measurements may be indicative of unified movement of frame 106 and user's head (or face) 120, according to an embodiment. Position sensor 118 may be implemented as a proximity sensor that detects position or displacement of frame 106 relative to a bridge of the user's nose 124. When implemented as a proximity sensor, position sensor 118 may provide displacement data for frame 106 along a z-axis, according to an embodiment. Position sensor 118 may also be configured to provide displacement data along the x, y, and z axes by including, for example, an optical flow sensor and/or an IMU. Displacement data from position sensor 114, reference sensor 116, and position sensor 118 may be individually used or may be combined and provided to eye tracking system 104 or controller 140 to enable eye tracking system 104 to account for displacement of frame 106 relative to user's face 110, according to an embodiment. For illustration purposes, position sensor 114, reference sensor 116, and position sensor 118 are shown positioned in particular locations on arm 108 and frame 106, but it is to be understood that these sensors could perform their function at a number of various locations on arm 108 and frame 106. Additionally, frame tracking system 102 may include multiple position sensors and proximity sensors positioned at various locations on frame 106 (inclusive of arm 108). Frame tracking system 102 may also include a controller or control logic (e.g., controller 140, processing logic 142).

Eye tracking system 104 may include at least one absolute eye orientation sensor 126, at least one relative eye orientation sensor 128, and a number of light sources 130, according to an embodiment. Components of eye tracking system 104 may be located on a bottom of frame 106 (e.g., near the cheek bone), along a side of frame 106, or on arm 108 (e.g., near the side of eye 112), according to various embodiments. Absolute eye orientation sensor 126 may be implemented as an image sensor configured to capture an image of at least a portion of eye 112 and determine an orientation of eye 112 based on the image. The image may be a relatively high-resolution image, which may consume more resources (time, battery, processing power) than a low-resolution image capture. Absolute eye orientation sensor 126 may be configured to be operated less frequently (e.g., twice a second) than relative eye orientation sensor 128. Absolute eye orientation sensor 126 may be implemented as a high resolution, high accuracy, low precision, and low frame rate sensor configured to image the eye and determine the absolution position of the eye and the gaze at intermittent time intervals.

Relative eye orientation sensor 128 may be implemented as a single sensor or an array of simple sensors configured to capture sparse signals from eye 112, according to an embodiment. Sparse signals includes signals resulting from merging input from various sensor sources. Sparse signals may be read and transmitted frequently while consuming less resources (e.g., power, bandwidth, processing, time) than data from absolute eye orientation sensor 126, according to an embodiment. Sparse signals may be used to infer the change in orientation of eye 112 from one instant in time to the next instant in time, without generating a traditional 2D image. These sensors might be optical or could also be non-optical sensors. Relative eye orientation sensor 128 may be implemented as a photodetector, an ultrasonic sensor, capacitive sensor, electrooculography (EOG), or some other optical or non-optical sensors. The sparse signals may be used to infer a change in orientation of eye 112 using models (e.g., predictive models, machine learning models, etc.). Since the output of relative eye orientation sensor 128 is sparse and frequently updated, absolute eye orientation sensor 126 may be periodically used to compensate for any drift (e.g., gradually accumulated error) that may occur while using relative eye orientation sensor 128 to track eye 112. Relative eye orientation sensor 128 may be configured to capture sparse signals more frequently (e.g., 4000 times a second) than absolute eye orientation sensor 126. Relative eye orientation sensor 128 may be implemented as a low-weight, small-sized, low-power, high-precision, low-accuracy, and low-cost sensor that is configured to measure the relative change in position of the eye over time. In other words, relative eye orientation sensor 128 may be implemented as a SWAP-C (size, weight, power, cost) optimized sensor. A compute platform, e.g., controller 140, is configured to receive data from the two different types of sensors (i.e., absolute and relative orientation sensors) and merge these data streams together to provide a high precision, high accuracy signal about where the eye is oriented at all times, at a higher temporal resolution than can be achieved (e.g., reasonably implemented in a head-mounted device) by an absolute eye orientation sensor alone, according to an embodiment.

Absolute eye orientation sensor 126 and relative eye orientation sensor 128 may operate on specular reflections and diffuse scattering of light that are provided by light sources 130. Light sources 130 may emit light in the non-visible light spectrum (e.g., infrared). For example, light sources 130 are configured to emit infrared light, for example, having a wavelength in the range of 750 nm to 1500 nm, according to an embodiment. Light sources 130 may be implemented as light emitting diodes (LEDs), vertical-cavity surface-emitting lasers (VCSELs), edge-emitting laser (EEL), micro light emitting diode (micro-LED), an edge emitting LED, a superluminescent diode (SLED), or another type of light source. In one embodiment, light emitted from light sources 130 is infrared light centered around 850 nm.

Referring to FIG. 1C, head-mounted device 100 may be a type of device that is typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

Head-mounted device 100 may have multiple arms and multiple position sensors. Arm 108 may include arm 108A and arm 108B. Position sensor 114 may include position sensor 114A coupled to arm 108A and may include sensor 114B coupled to arm 108B. Additional position sensors may be disposed on various portions of frame 106 and arm 108A/108B.

Head-mounted device 100 may include a lens assembly 132 (individually, lens assembly 132A and 132B). Lens assembly 132 is mounted to, inserted into, or otherwise carried by frame 106. Lens assembly 132 may include a prescription optical layer matched to a particular user of head-mounted device 100 or may be a non-prescription lens. Lens assembly 132 may include a waveguide 134 (individually, waveguide 134A and 134B) and a projector 136 (individually, projector 136A and 136B) configured to display information to a user during operation of head-mounted device 100. Waveguide 134 may be included in one of a number of optical layers of lens assembly 132, or waveguide 134 may be integrated into, for example, a single optical layer that defines lens assembly 132. Projector 136 may be positioned at least partially in or on frame 106 and may be optically coupled to waveguide 134. Lens assembly 132 may appear transparent to a user to facilitate augmented reality or mixed reality and to enable a user to view scene light from the environment around her while also receiving image light directed to her eye(s). Consequently, lens assembly 132 may be considered (or include) an optical combiner. Lens assembly 132 may include two or more optical layers. In some embodiments, display light from one or more integrated waveguide displays is directed into one or both eyes of the wearer of head-mounted device 100. The illustrated head-mounted device 100 is configured to be worn on or about a head of a wearer of head-mounted device 100.

Head-mounted device 100 may include one or more outward facing cameras 138 that may be positioned on frame 106 or on arm 108A/108B. Outward facing cameras 138 may be configured to image surroundings of head-mounted device 100, and head-mounted device 100 may be configured to use the images to customize user interface options for a user.

Head-mounted device 100 includes a controller 140 communicatively coupled to the various electronics carried by head-mounted device 100, according to an embodiment. Controller 140 may be configured to operate frame tracking system 102 and eye tracking system 104. Controller 140 may include processing logic 142 and one or more memories 144 to analyze image data received from one or more of absolute eye orientation sensor 126, relative eye orientation sensor 128, position sensor 114A/114B, reference sensor 116, position sensor 118, and cameras 138, to determine an orientation of one or more of a user's eyes, to perform one or more frame tracking operations, to perform one or more eye tracking operations, and/or to display or provide user interface elements in lens assembly 132, according to an embodiment. Controller 140 may include a wired and/or wireless data interface for sending and receiving data and graphic processors and may use one or more memories 144 for storing data and computer-executable instructions. Controller 140 and/or processing logic 142 may include circuitry, logic, instructions stored in a machine-readable storage medium, ASIC circuitry, FPGA circuitry, and/or one or more processors. In one embodiment, head-mounted device 100 may be configured to receive wired power. In one embodiment, head-mounted device 100 is configured to be powered by one or more batteries. In one embodiment, head-mounted device 100 may be configured to receive wired data including video data via a wired communication channel. In one embodiment, head-mounted device 100 is configured to receive wireless data including video data via a wireless communication channel.

Figure 2:
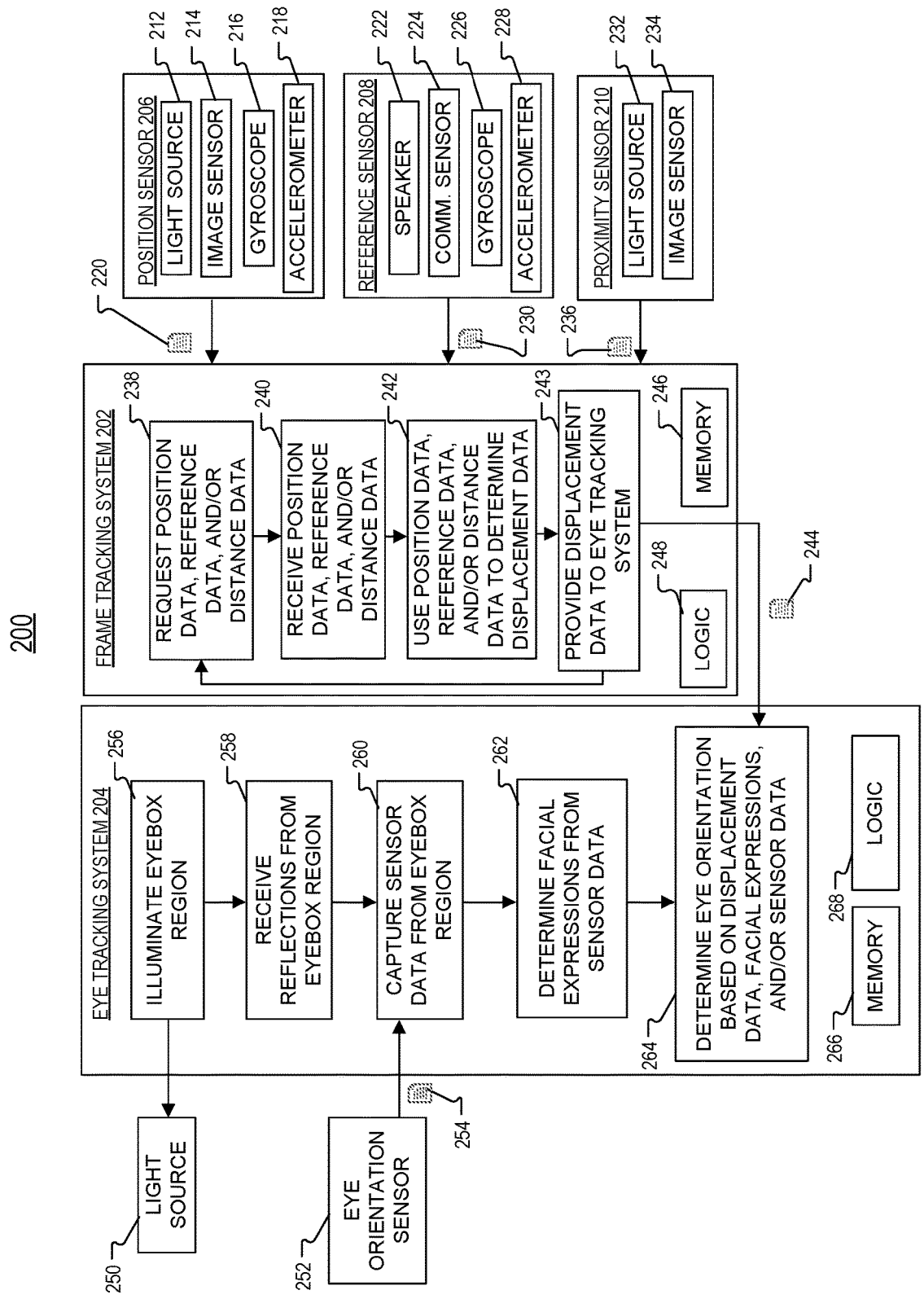
FIG. 2 illustrates an example flow diagram of a tracking system environment, in accordance with aspects of the disclosure.

FIG. 2 illustrates an example diagram of a tracking system environment 200, in accordance with aspects of the disclosure. Tracking system environment 200 includes a frame tracking system 202 and an eye tracking system 204, according to an embodiment. Frame tracking system 202 may be configured to determine a displacement of a head-mounted device frame and provide displacement data to eye tracking system 204. Eye tracking system 204 may be configured to use the displacement data with other eye tracking information to determine an eye orientation of a user of a head-mounted device. Frame tracking system 202 is an example implementation of frame tracking system 102 (shown in FIG. 1A), and eye tracking system 204 is an example implementation of eye tracking system 104 (shown in FIG. 1B), according to an embodiment.

Frame tracking system 202 may be configured to use one or more of a variety of sensors to determine displacement data for a head-mounted device frame, according to an embodiment. For example, frame tracking system 202 may interact with or may include a position sensor 206, a reference sensor 208, and a proximity sensor 210, to determine position or displacement of the head-mounted device frame. Position sensor 206 may include a light source 212, an image sensor 214, a gyroscope 216, and an accelerometer 218. Position sensor 206 may use the various components to generate position data 220, which may be absolute or relative position data. Reference sensor 208 may include a speaker 222 (e.g., an earbud), a communication sensor 224 (e.g., Bluetooth, WiFi, etc.), a gyroscope 226, and an accelerometer 228, according to an embodiment. Reference sensor 208 may use the various components to generate reference data 230, which may be position or displacement data associated with a particular part of the user's body (e.g., ear, neck, etc.), according to an embodiment. Proximity sensor 210 may include a light source 232 and an image sensor 234, which may be used to generate distance data 236, according to an embodiment. Distance data 236 may represent a distance between the head-mounted device frame and a particular portion of a user's face (e.g., the bridge of a nose, a forehead, a cheekbone, etc.).

In operation, frame tracking system 202 may include or may progress through a number of operation blocks to acquire and utilize position data 220, reference data 230, and/or distance data 236, in accordance with aspects of the disclosure. The operation blocks may be performed in parallel or in an order other than the described order.

At operation block 238, frame tracking system 202 may request position data 220, reference data 230, and/or distance data 236. Requesting the various data may include establishing communication channels that are wired or wireless to communicate with position sensor 206, reference sensor 208, and/or proximity sensor 210. Operation block 238 may proceed to operation block 240, according to an embodiment.

At operation block 240, frame tracking system 202 may receive position data 220, reference data 230, and/or distance data 236, according to an embodiment. Operation block 240 may proceed to operation block 242, according to an embodiment.

At operation block 242, frame tracking system 202 may use position data 220, reference data 230, and/or distance data 236 to determine displacement data 244. Displacement data 244 represents a displacement of a head-mounted device frame in one, two, or three axes (e.g., x, y, z-axes), according to an embodiment. Operation block 242 may proceed to operation block 243, according to an embodiment.

At operation block 243, frame tracking system 202 may provide displacement data 244 to eye tracking system 204. Frame tracking system 202 may provide displacement data 244 to eye tracking system 204 to support and improve accuracy in eye tracking functionality in a head-mounted device, for example.

Frame tracking system 202 may also include memory 246 and logic 248. Memory 246 may be used to store computer readable instructions that are associated with operations of frame tracking system 202, and logic 248 may be configured to execute the instructions to support operation of frame tracking system 202, according to an embodiment.

Eye tracking system 204 may include a light source 250 (e.g., LED, VCSEL, laser, etc.) and an eye orientation sensor 252 to support eye tracking functionality, according to an embodiment. Light source 250 may be configured to illuminate an eyebox region with, for example, non-visible light. Light source 250 may include a number of light sources disposed in various locations on or around a head-mounted device frame. Eye orientation sensor 252 may be configured to provide sensor data 254, which may be representative of ultrasonic data, photodetector data, capacitive data, and/or an image of reflections from light source 250 from an eyebox region (e.g., an eye of a user) of a head-mounted device. As used herein an eyebox region is generally the area and volume where a user's eyes may be positioned while wearing a head-mounted device.

Eye tracking system 204 may be configured to perform a number of operations to determine an eye orientation based on displacement data 244 and other eye tracking information.

At operation block 256, eye tracking system 204 may illuminate an eyebox region. Illuminating the eyebox region may include providing a pattern, a particular frequency, or other control signals to light source 250 to cause light source 250 to illuminate the eyebox region. Operation block 256 proceeds to operation block 258, according to an embodiment.

At operation block 258, eye tracking system 204 may receive reflections from the eyebox region, according to an embodiment. The reflections may be received by eye orientation sensor 252, a photodetector, or some non-optical sensor. Eye orientation sensor 252 may represent more than one sensor and may represent, for example, an absolute eye orientation sensor and a relative eye orientation sensor. Reflections from the eyebox region may also include ultrasonic reflections, or reflections that may be detected by a capacitive sensor. Operation block 258 proceeds to operation block 260, according to an embodiment.

At operation block 260, eye tracking system 204 may capture sensor data from the eyebox region. Capturing sensor data may include receiving sensor data 254 from eye orientation sensor 252, according to an embodiment. Eye orientation sensor 252 may represent an image sensor used as an absolute eye orientation sensor and may include one or more relative eye orientation sensors (e.g., photodetector, ultrasonic sensor, capacitive sensor, or other sparse signal sensor). Operation block 260 may proceed to operation block 262, according to an embodiment.

At operation block 262, eye tracking system 204 may determine facial expressions from sensor data 254, according to an embodiment. Facial expressions may be determined by, for example, a machine learning model or other pattern recognition techniques applied to one or more images of the eyebox region or image of the facial features surrounding the eyebox region. Eye tracking system 204 and/or eye orientation sensor 252 may include one or more cameras that are positioned on the head-mounted device and configured to capture portions of the user's face in order to determine facial expressions. Because facial expressions can displace the head-mounted device frame (while an eye orientation is relatively fixed), facial expressions can be considered noise in an eye tracking algorithm or operation. Facial expressions can include raised eyebrows, a scrunched nose, squinted eyes, a wink, a contraction of face muscles (e.g., as done in a sneeze), a smile, or similar expressions. Facial expressions may be used by eye tracking system 204 to identify and reduce noise from an eye orientation signal, to improve the accuracy of eye tracking system 204, according to an embodiment. Operation block 262 may proceed to operation block 264, according to an embodiment.

At operation block 264, eye tracking system 204 may determine an eye orientation based on displacement data 244, facial expressions, and/or sensor data 254, according to an embodiment. Eye tracking system 204 may be configured to subtract displacement data 244 from eye orientation measurements from sensor data 254. Eye tracking system 204 may be configured to reduce or ignore eye orientation movement or measurements based on whether one or more facial expressions were detected.

Eye tracking system 204 may include memory 266 and logic 268 that are configured to store and execute various instructions to perform operations of eye tracking system 204. Memory 266 may be at least partially shared with memory 246, and logic 268 may be at least partially shared with logic 248, according to an embodiment. Frame tracking system 202 may be a subsystem of eye tracking system 204, or frame tracking system 202 may be configured to operate independent of eye tracking system 204, according to various embodiments.

FIGS. 3A, 3B, 3C, and 3D illustrate example diagrams of sensor configurations that may be used to determine head-mounted device frame displacement, in accordance with aspects of the disclosure. One or more of the sensor configurations may be disposed at a single location or at several locations around a head-mounted device frame to determine displacement data for the head-mounted device frame at one or multiple locations. Various features of the position sensors may be combined with one or more other position sensors.

FIG. 3A illustrates a sensor configuration 300 that may be used to determine a displacement distance for a head-mounted device frame 302, in accordance with aspects of the disclosure. Head-mounted device frame 302 is representative of a portion of a head-mounted device frame (inclusive of head-mounted device arms, a helmet, or other cranial attachment implement). Sensor configuration 300 may include a position sensor 304 that is coupled to or partially integrated into head-mounted device frame 302. Position sensor 304 may be configured to determine a displacement distance for head-mounted device frame 302 based on optic flow of a pattern. Optic flow of a pattern may refer to the change of position of a pattern within an image, with respect to time. Position sensor 304 may include a light source 306 configured to illuminate a patch of skin 308. Light source 306 may be an LED, a VCSEL, a micro-LED, an edge-emitting LED, a SLED, or another type of light source. Light source 306 may illuminate patch of skin 308 with a light pattern, and the light pattern may include fringes patterns, dots, grids, lines, concentric circles, or other shapes. Position sensor 304 may include an image sensor 310 configured to generate an image based on reflections from patch of skin 308. The image may include a pattern 312 of hair follicles 314 or of the emitted light pattern. Position sensor 304 may determine a displacement of head-mounted device frame 302 based on how much pattern 312 shifts in any particular direction. In one embodiment, position sensor 304 is used to measure a depth map change as a function of time. In one embodiment, a simultaneous localization and mapping (SLAM) sensor may be used to calculate the movement of head-mounted device frame 302. In one embodiment, position sensor 304 may be configured as a time-of-flight (ToF) sensor that is configured to measure, for example, absolute distance to a user's face or head.

FIG. 3B illustrates a sensor configuration 320 that may be used to determine a displacement distance for a head-mounted device frame 322, in accordance with aspects of the disclosure. Sensor configuration 320 may include a position sensor 324 that is coupled to or partially integrated into head-mounted device frame 322. Position sensor 324 may be configured to determine a displacement distance for head-mounted device frame 322 based on laser speckle interferometry. Position sensor 324 may include a light source 326 configured to illuminate a patch of skin 328. Light source 326 may include a laser. The laser may be a long-coherence-length laser configured to provide light having electromagnetic wave propagation that are in phase in space and time. Position sensor 324 may condition the laser light using a beam-shaping optics, such as a lens, a grating, or a prism configured to change the far field light distribution from the laser source. Position sensor 324 may include an image sensor 330 configured to generate an image based on reflections from patch of skin 328. Image sensor 330 may be a single pixel sensor or may include a two-dimensional array of pixels. The image may include a speckle pattern 332 caused by constructive and destructive interference of reflections of the laser light. Position sensor 324 may determine displacement of head-mounted device frame 322 based on how much speckle pattern 332 shifts in any particular direction when subsequently captured images are compared. An advantage of laser speckle interferometry is that the technique may enable high-resolution tracking of surfaces, as compared to other types of light sources. Position sensor 324 may be implemented as a ToF sensor, as a light detection and ranging (LIDAR) sensor, as a frequency modulated continuous wave (FMCW) LIDAR sensor, or as a, optical coherence tomography (OCT) sensor, according to various embodiments.

FIG. 3C illustrates a sensor configuration 340 that may be used to determine a displacement distance for head-mounted device frame 342, in accordance with aspects of the disclosure. Sensor configuration 340 may include a position sensor 344 that is coupled to or partially integrated into head-mounted device frame 342. Position sensor 344 may be configured to determine a displacement distance for head-mounted device frame 342 based on relative distance displacement between position sensor 344 and a reference sensor 346. Position sensor 344 may include at least one gyroscope 348 and at least one accelerometer 350. Gyroscope 348 and accelerometer 350 may operate together as an inertial measurement unit (IMU) to generate and provide displacement data 352. Reference sensor 346 may include at least one gyroscope 354, at least one accelerometer 356, and a communications sensor 358 (e.g., Bluetooth). Gyroscope 354 and accelerometer 356 may operate together as an IMU to generate and provide reference (displacement) data 360. Reference data 360 may be provided using communications sensor 358. Sensor configuration 340 may include a controller 362 that is configured to receive displacement data 352 and reference data 360. Controller 362 may be configured to use the difference between displacement data 352 and reference data 360 to determine a relative displacement of head-mounted device frame 342 with respect to a user's face or head. Reference sensor 346 may be implemented as an earpiece (e.g., an earbud) that a user may use to receive or provide audio information.

FIG. 3D illustrates a sensor configuration 380 that may be used to determine a displacement distance for head-mounted device frame 342, in accordance with aspects of the disclosure. Sensor configuration 380 may include a reference sensor 364. Reference sensor 364 may be implemented as a neckpiece (e.g., a collar or necklace) that a user may wear ornamentally, for example, on or around the user's neck. Reference sensor 364 may include at least one gyroscope 366, at least one accelerometer 368, and a communications sensor 370 (e.g., Bluetooth). Gyroscope 366 and accelerometer 368 may operate together as an IMU to generate and provide reference (displacement) data 372. Reference data 372 may be provided using communications sensor 370. Sensor configuration 380 may include a controller 374 that is configured to receive displacement data 352 and reference data 372. Controller 374 may be configured to use the difference between displacement data 352 and reference data 372 to determine a relative displacement of head-mounted device frame 342 with respect to a user's face or head.

Figure 4:
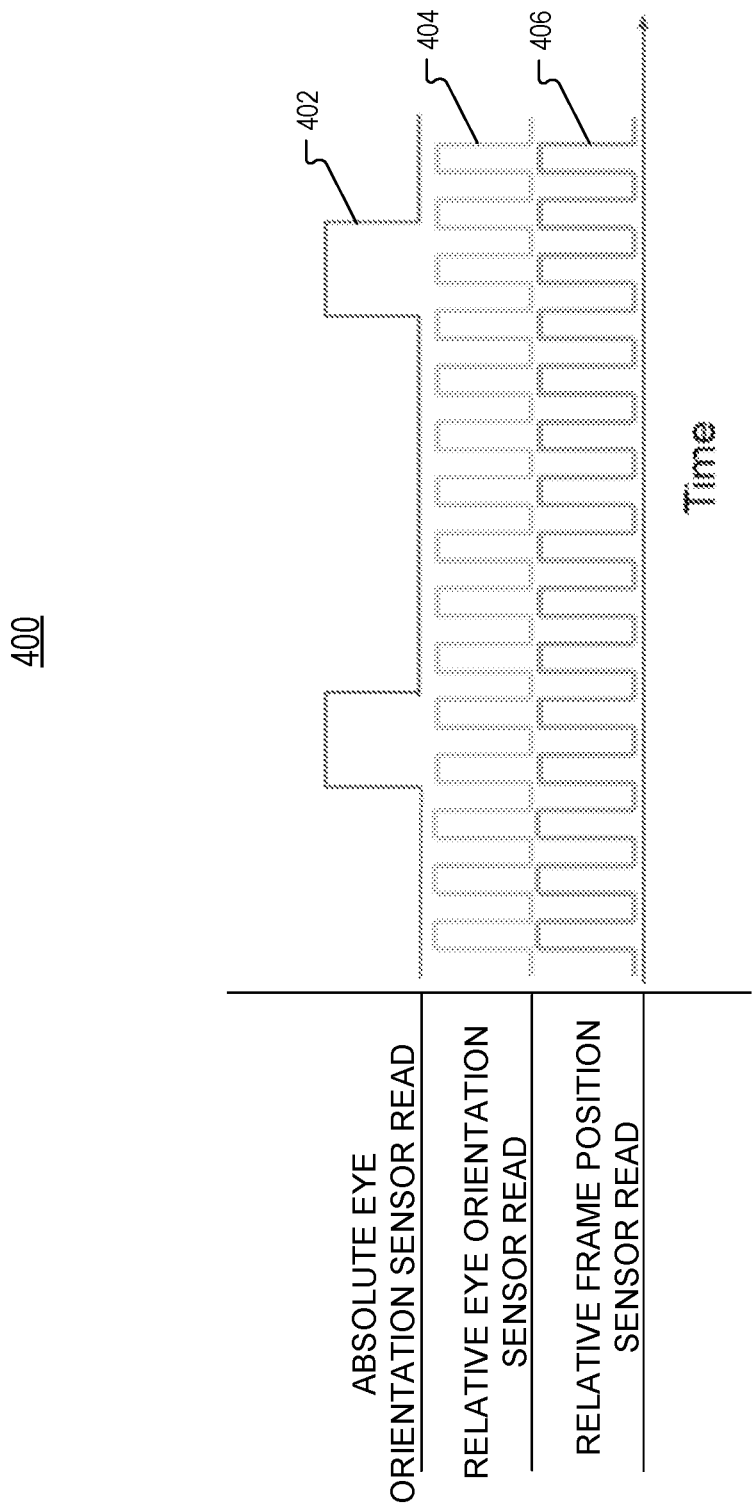
FIG. 4 illustrates an example timing diagram that shows when various sensors may be read, in accordance with aspects of the disclosure.

FIG. 4 illustrates an example timing diagram 400 that shows when various sensors may be read, in accordance with aspects of the disclosure. Timing diagram 400 may have a number of waveforms that correspond with operating or reading data from various sensors. Timing diagram 400 may include, for example, a waveform 402, a waveform 404, and a waveform 406. Waveform 402 may correspond with an absolute eye orientation sensor read (or operation). Waveform 404 may correspond with a relative eye orientation sensor read. Waveform 406 may correspond with a relative frame position sensor read. As shown, an absolute eye orientation sensor may be read at different intervals (e.g., less frequently) than a relative eye orientation sensor. An absolute eye orientation sensor may also be read at different intervals (e.g., less frequently) than a relative frame orientation sensor. Each of the various types of position sensors (e.g., eye, frame, position, reference, and/or proximity sensors) may be read at different intervals, or some of the various types of position sensors may be read at similar intervals (e.g., the relative eye orientation sensor and the relative frame position sensor), according to various embodiments.

Figure 5:
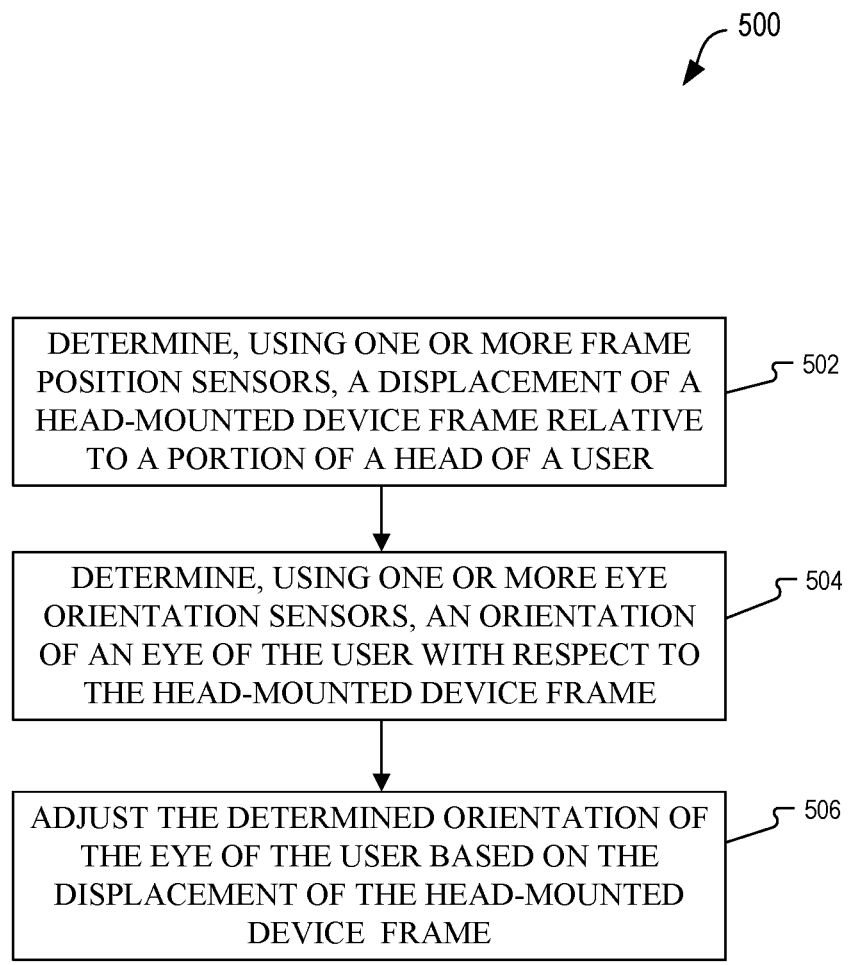
FIG. 5 illustrates a flow diagram of a process for eye tracking for a head-mounted device, in accordance with aspects of the disclosure.

FIG. 5 illustrates a flow diagram of process 500 for eye tracking for a head-mounted device, in accordance with aspects of the disclosure. The order in which some or all of the process or operation blocks appear in process 500 should not be deemed limiting. Rather, one of ordinary skill in the art having the benefit of the present disclosure will understand that some of the operation blocks may be executed in a variety of orders not illustrated, or even in parallel.

At operation block 502, process 500 may determine, using one or more position sensors, a displacement of a head-mounted device frame relative to a portion of a user's head, according to an embodiment. Operation block 502 may proceed to operation block 504, according to an embodiment.

At operation block 504, process 500 may determine, using one or more eye orientation sensors, an orientation of an eye of the user with respect to the head-mounted device frame, according to an embodiment. Operation block 504 may proceed to operation block 506, according to an embodiment.

At operation block 506, process 500 may adjust the determined orientation of the eye of the user based on the displacement of a head-mounted device frame, according to an embodiment. Process 500 may include adjusting the determined orientation of the user's eye based on identified facial expressions, which may also introduce noise into eye orientation determinations. The head-mounted device frame displacement distance may be determined based on one or more of a frame position sensor, a frame reference sensor (e.g., an earbud, a collar, a headband, or another wearable sensor), and a proximity sensor. Accounting and compensating for displacement or movement of the head-mounted device frame may be used to improve the accuracy of eye tracking systems.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted device connected to a host computer system, a standalone head-mounted device, a mobile device or computing system, or any other hardware platform capable of providing artificial reality content to one or more viewers.

The term "processing logic" (e.g., controller 140, processing logic 142) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memory 144) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A frame tracking system for a head-mounted device comprising:
   one or more position sensors coupled to a head-mounted device frame and configured to detect displacement of the head-mounted device frame relative to the head of a user, wherein the one or more position sensors are configured to generate displacement data that is representative of the displacement of the head-mounted device frame, wherein the head-mounted device frame is configured to be carried by a head of a user;
   processing logic coupled to the one or more position sensors to receive the displacement data, wherein the processing logic is configured to determine a quantity of displacement of the head-mounted device frame relative to the head of the user; and
   a reference sensor communicatively coupled to the processing logic, wherein the reference sensor is configured to be worn by the user apart from the head-mounted device frame and is configured to generate reference data, and wherein the processing logic is configured to determine the quantity of displacement of the head-mounted device based on differences between the reference data and the displacement data.

2. The frame tracking system of claim 1, wherein the reference sensor includes an earpiece or a neckpiece.

3. The frame tracking system of claim 1, wherein the reference sensor includes one or more of a first accelerometer and a first gyroscope, where the reference data includes one or more of first accelerometer data and first gyroscope data, wherein the one or more position sensors include one or more of a second accelerometer and a second gyroscope, where the displacement data includes one or more of second accelerometer data and second gyroscope data.

4. The frame tracking system of claim 1, wherein the one or more position sensors include a coherent laser source, wherein the one or more position sensors include an optical flow sensor or an image sensor configured to generate displacement data streams from processed speckle pattern images.

5. The frame tracking system of claim 4, wherein the speckle pattern images are at least partially included in the displacement data.

6. The frame tracking system of claim 1, wherein the one or more position sensors include a light emitting diode (LED) and an image sensor configured to generate skin pattern data to determine the displacement of the head-mounted device.

7. The frame tracking system of claim 1, wherein the one or more position sensors include a proximity sensor, wherein the proximity sensor is positioned on a portion of the head-mounted device frame that carries a lens assembly, wherein the proximity sensor is configured to determine a distance between a user's face and the head-mounted device frame.

8. An eye tracking system for a head-mounted device comprising:
   a head-mounted device frame;
   a frame tracking system including:
      one or more position sensors coupled to the head-mounted device frame and configured to detect displacement of the head-mounted device frame relative to the head of a user, wherein the one or more position sensors are configured to generate displacement data that is representative of the displacement of the head-mounted device frame, wherein the one or more position sensors include a light emitting diode (LED) and an image sensor configured to generate skin pattern data to determine the displacement of the head-mounted device; and
      frame tracking processing logic coupled to the one or more position sensors to receive the displacement data, wherein the frame tracking processing logic is configured to determine a quantity of displacement of the head-mounted device frame relative to the head of the user;
   one or more light sources configured to emit light towards an eyebox region of a head-mounted device;
   one or more eye orientation sensors configured to generate sensor data from reflections from the eyebox region; and
   eye tracking processing logic coupled to the one or more light sources and to the one or more eye orientation sensors, wherein the eye tracking logic is configured to determine an orientation of an eye of a user based on the sensor data and based on the displacement data.

9. The eye tracking system of claim 8, wherein the one or more eye orientation sensors include a first eye orientation sensor and a second eye orientation sensor, wherein the first eye orientation sensor is configured to capture images with a first time interval, wherein the second eye orientation sensor is configured to capture relative eye position data with a second time interval.

10. The eye tracking system of claim 9, wherein the first time interval is longer than the second time interval.

11. The eye tracking system of claim 9, wherein the first eye orientation sensor is configured to identify an absolute eye orientation of the eye of the user, wherein the second eye orientation sensor is configured to identify a relative eye orientation of the eye of the user.

12. The eye tracking system of claim 8 further comprising:
- a controller including memory and controller processing logic, wherein the controller processing logic includes the frame tracking processing logic and the eye tracking processing logic.

13. The eye tracking system of claim 8 further comprising:
- a reference sensor communicatively coupled to the frame tracking processing logic, wherein the reference sensor is configured to be worn by the user apart from the head-mounted device frame and is configured to generate reference data that is representative of displacement of a portion of the user, wherein the frame tracking processing logic is configured to determine the quantity of displacement of the head-mounted device based on differences between the reference data and the displacement data.

14. The eye tracking system of claim 13, wherein the reference sensor includes one or more of a first accelerometer and a first gyroscope, where the reference data includes one or more of first accelerometer data and first gyroscope data, wherein the one or more position sensors include one or more of a second accelerometer and a second gyroscope, wherein the displacement data includes one or more of second accelerometer data and second gyroscope data.

15. A method of eye tracking for a head-mounted device comprising:
- determining a displacement distance of a head-mounted device frame relative to a portion of a head of a user based on a relative distance displacement between a position sensor disposed in a frame of the head-mounted device and a reference sensor worn by a user apart from the head-mounted device frame, wherein the reference sensor is configured to generate reference data, and wherein the relative distance displacement is determined by one or more position sensors coupled to the head-mounted device frame;
- determining, using one or more eye orientation sensors, an orientation of an eye of the user; and
- adjusting the determined orientation of the eye of the user based on the displacement distance of the head-mounted device frame, wherein the displacement distance of the head-mounted device is based on differences between the reference data and the relative distance displacement.

16. The method of claim 15 further comprising:
- identifying one or more facial expressions using the one or more eye orientation sensors; and
- adjusting the determined orientation of the eye of the user based on the one or more facial expressions.

17. The method of claim 15 further comprising:
- illuminating an eyebox region of the head-mounted device using one or more light sources; and
- generating sensor data of the eyebox region with the one or more eye orientation sensors, wherein determining the orientation of the eye of the user is based on the sensor data.

18. The method of claim 15, wherein the position sensor includes a light source and an image sensor, and wherein the position sensor is configured to determine the displacement distance by an arm of the head-mounted device along a y-axis and a z-axis of the arm.

19. The method of claim 15, wherein the reference sensor is communicatively coupled to frame tracking processing logic disposed in the head-mounted device.

20. The method of claim 15, wherein the reference sensor includes one or more of a first accelerometer and a first gyroscope, and wherein the position sensor includes one or more of a second accelerometer and a second gyroscope.

* * * * *